US012387408B2

(12) United States Patent
Lee et al.

(10) Patent No.: US 12,387,408 B2
(45) Date of Patent: Aug. 12, 2025

(54) SIMULATING GARMENT USING VERTICES FIXED WITH DIFFERENT INTENSITIES

(71) Applicant: CLO Virtual Fashion Inc., Seoul (KR)

(72) Inventors: Yongjoon Lee, Seoul (KR); Inho Park, Seoul (KR)

(73) Assignee: CLO Virtual Fashion Inc., Seoul (KR)

( * ) Notice: Subject to any disclaimer, the term of this patent is extended or adjusted under 35 U.S.C. 154(b) by 194 days.

(21) Appl. No.: 17/970,420

(22) Filed: Oct. 20, 2022

(65) Prior Publication Data

US 2024/0135615 A1 Apr. 25, 2024
US 2024/0233227 A9 Jul. 11, 2024

(51) Int. Cl.
*G06T 13/20* (2011.01)

(52) U.S. Cl.
CPC .......... *G06T 13/20* (2013.01); *G06T 2200/24* (2013.01); *G06T 2210/21* (2013.01)

(58) Field of Classification Search
CPC .. G06T 13/20; G06T 2200/24; G06T 2210/21
See application file for complete search history.

(56) References Cited

U.S. PATENT DOCUMENTS

| | | | |
|---|---|---|---|
| 9,754,410 B2* | 9/2017 | Hua | G06T 7/75 |
| 10,229,228 B2* | 3/2019 | Belmans | G06F 30/23 |
| 10,242,498 B1* | 3/2019 | Leong | G06T 17/205 |
| 10,482,646 B1* | 11/2019 | Dalstein | G06T 17/20 |
| 11,321,916 B1* | 5/2022 | Zhang | G06T 19/00 |
| 2011/0161061 A1* | 6/2011 | Wu | G06T 17/20 703/2 |
| 2017/0161948 A1* | 6/2017 | Hua | A41H 1/02 |
| 2017/0351323 A1* | 12/2017 | Colaianni | G06F 3/0325 |
| 2018/0300959 A1* | 10/2018 | Souza | G06T 17/20 |
| 2019/0139303 A1* | 5/2019 | Leong | G06T 17/20 |
| 2021/0118239 A1* | 4/2021 | Santesteban | G06N 3/044 |
| 2022/0092865 A1* | 3/2022 | Lee | G06F 3/04847 |
| 2022/0157020 A1* | 5/2022 | Kang | G06T 17/205 |

(Continued)

FOREIGN PATENT DOCUMENTS

| KR | 10-2016-0117021 A | 10/2016 |
|---|---|---|
| KR | 10-2017-0068741 A | 6/2017 |
| KR | 10-2021-0021929 A | 3/2021 |

OTHER PUBLICATIONS

Marvelous Designer Team, "Marvelous Designer 9.5 Release," Apr. 29, 2020, pp. 1-3.

(Continued)

*Primary Examiner* — Michael Le
(74) *Attorney, Agent, or Firm* — WTA Patents (57) ABSTRACT

A simulation method and apparatus receive an input for selecting a partial area of a three-dimensional (3D) model of a garment using a user interface including an internal geometric shape and an external geometric shape, fix first vertices of a first area corresponding to the internal geometric shape to a 3D space at a first intensity, determine second intensities corresponding to second vertices of a second area between the internal geometric shape and the external geometric shape based on the first intensity, fix the second vertices to the 3D space at the second intensities, and simulate the 3D model of the garment by applying the first intensity and the second intensities.

18 Claims, 8 Drawing Sheets

(56) References Cited

U.S. PATENT DOCUMENTS

2022/0215224 A1\* 7/2022 Sareen ............... G06Q 30/0621
2024/0037827 A1\* 2/2024 Zhou ....................... G06T 13/40

OTHER PUBLICATIONS

Youtube, "Marvelous Designer 9.5 New Features: Partial Freeze," Marvelous Designer, Apr. 21, 2020, one page, [Online] [Retrieved on Oct. 21, 2022] Retrieved from the Internet <URL:https://www.youtube.com/watch?v=3U3GvK_6OTo>.

\* cited by examiner

First intensity ($S_1$) > Second intensity ($S_2$) > Third intensity ($S_3$)

SIMULATING GARMENT USING VERTICES FIXED WITH DIFFERENT INTENSITIES

BACKGROUND

1. Field of the Invention

This invention relates to simulation of a garment on a virtual avatar, more specifically to simulating a partial area of a garment selected through a user interface.

2. Description of the Related Art

A garment appears in three dimensions when worn on a person's body, but it is more of a two dimensional object because it is actually a combination of pieces of fabric cut according to a two-dimensional (2D) pattern. Because fabric is a flexible material, it may be varied in appearance from moment to moment according to a body shape or motion of a person who wears it. For example, when multiple outfits including a shirt, a cardigan, and a jacket are worn on an avatar, the shirt and cardigan, or the cardigan and jacket may collide with each other, or the jacket or shirt may be partially wrinkled or pleated. As such, when a portion of the garment is to be deformed to express various details, collision and/or details such as crinkles in the portion of the garment should be accounted for to generate accurate appearance of the outfits.

SUMMARY

Embodiments relate to a simulation method that simulates deformation or movement of a 3D model of a garment by fixing first vertices with first virtual springs and fixing second vertices with second virtual springs. Selection of a partial area of a three-dimensional (3D) model of a garment is received. The partial area includes an internal geometric shape and an external geometric shape. First virtual springs are assigned to first vertices of a first area in the internal geometric shape to fix the first vertices in 3D space with a first intensity. Second virtual springs are assigned to second vertices in a second area between the internal geometric shape and the external geometric shape to fix the second vertices in the 3D space with second intensities. The simulation is performed by fixing the first vertices with the first virtual springs and fixing the second vertices with the second virtual springs.

In one or more embodiments, one end of each of the virtual spring is connected to a corresponding first vertex or second vertex and another end of each of the virtual spring is fixed to a position in the 3D space.

In one or more embodiments, each of the second intensities is smaller than the first intensity, the second intensities gradually increasing as distances of the second vertices increase from the internal geometric shape. Less movement or deformation of a vertex in the 3D space is permitted when the vertex is fixed with a higher intensity.

In or more embodiments, the first intensity is greater than the second intensities.

In one or more embodiments, the 3D model of the garment is simulated by determining a fixing force acting on vertices of a mesh of the 3D model of the garment based on the first intensity and the second intensities, and a repulsive force to prevent a collision between the 3D model of the garment and a 3D model of another object. The positions of the vertices are determined based at least on the fixing force and the repulsive force.

In one or more embodiments, the positions of the vertices are determined by determining whether a collision occurs between the mesh of the 3D model of the garment and the 3D model of the other object due to the force acting on the vertices. In response to determining that the collision occurs, the repulsive force is applied on vertices of the 3D model of the garment where the collision occurs.

In one or more embodiments, gradient direction of a distance field is determined. The distance field indicates distances from a surface of the 3D model of the garment to voxels in 3D space. A direction of the repulsive force on the vertices of the 3D model of the garment is determined as the gradient direction or a direction opposite to the gradient direction.

In one or more embodiments, in response to repeatedly receiving the selection of the partial area, the first intensity and the second intensities are cumulatively increased in proportion to a number of times that the selection is received. The 3D model of the garment is simulated by applying the cumulatively increased first intensity and second intensities to vertices in the partial area of the 3D model of the garment.

In one or more embodiments, setting of the internal geometric shape and the external geometric shape is received from a user.

In one or more embodiments, the internal geometric shape and the external geometric shape are circles that are concentric.

In one or more embodiments, the 3D model of the garment is a virtual garment for a 3D virtual character or a virtual garment for a 3D virtual avatar.

In one or more embodiments, polygons of a mesh forming the 3D model of the garment in the first area is searched to assign the first virtual springs. Polygons of the mesh in the second area are also searched to assign the second virtual springs.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings. Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

Also, the terms "first," "second," "A," "B," "(a)," "(b)," and the like may be used herein to describe components according to example embodiments. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example embodiment is described using a like name in another example embodiment. Unless otherwise described, description made in one example embodiment may be applicable to another example embodiment and detailed description within a duplicate range is omitted.

Figure 1:
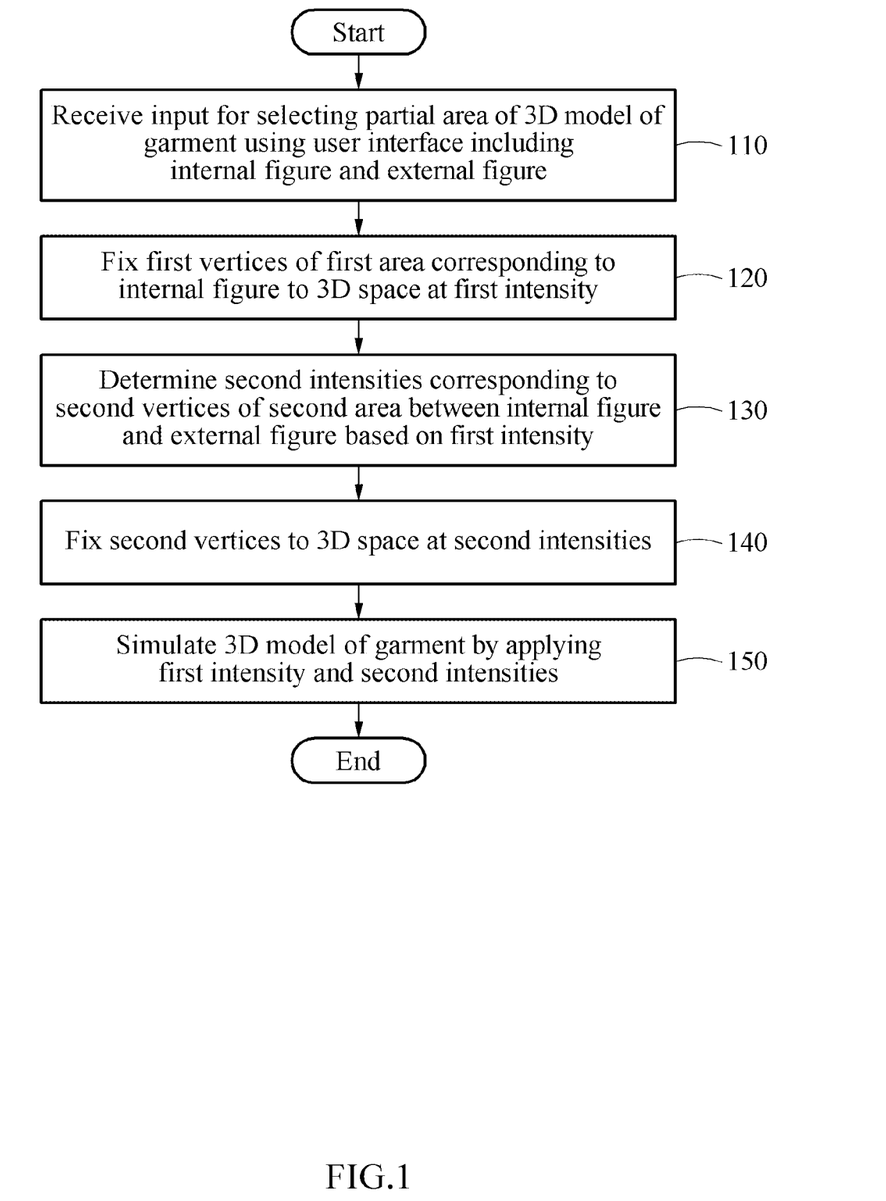
FIG. 1 is a flowchart illustrating a simulation method, according to an example embodiment.

FIG. 1 is a diagram illustrating a simulation method, according to an example embodiment. In the following example embodiments, operations may be sequentially performed, but are not necessarily performed sequentially. For example, the order of each operation may be changed, and at least two operations may be performed in parallel.

FIG. 1 illustrates a process of simulating a three-dimensional (3D) model of a garment through operations 110 to 150 in a simulation apparatus according to an example embodiment. In operation 110, the simulation apparatus receives an input for selecting a partial area of a 3D model of a garment using a user interface including an internal geometric shape and an external geometric shape. The input for selecting a partial area may be applied through a user motion, for example, a mouse click.

An area with the internal geometric shape may be referred to as a "first area" and an area between the internal geometric shape and the external geometric shape may be referred to as a "second area" hereinafter. Sizes of the internal geometric shape and the external geometric shape may be variously adjusted through a user's setting.

Figure 2:
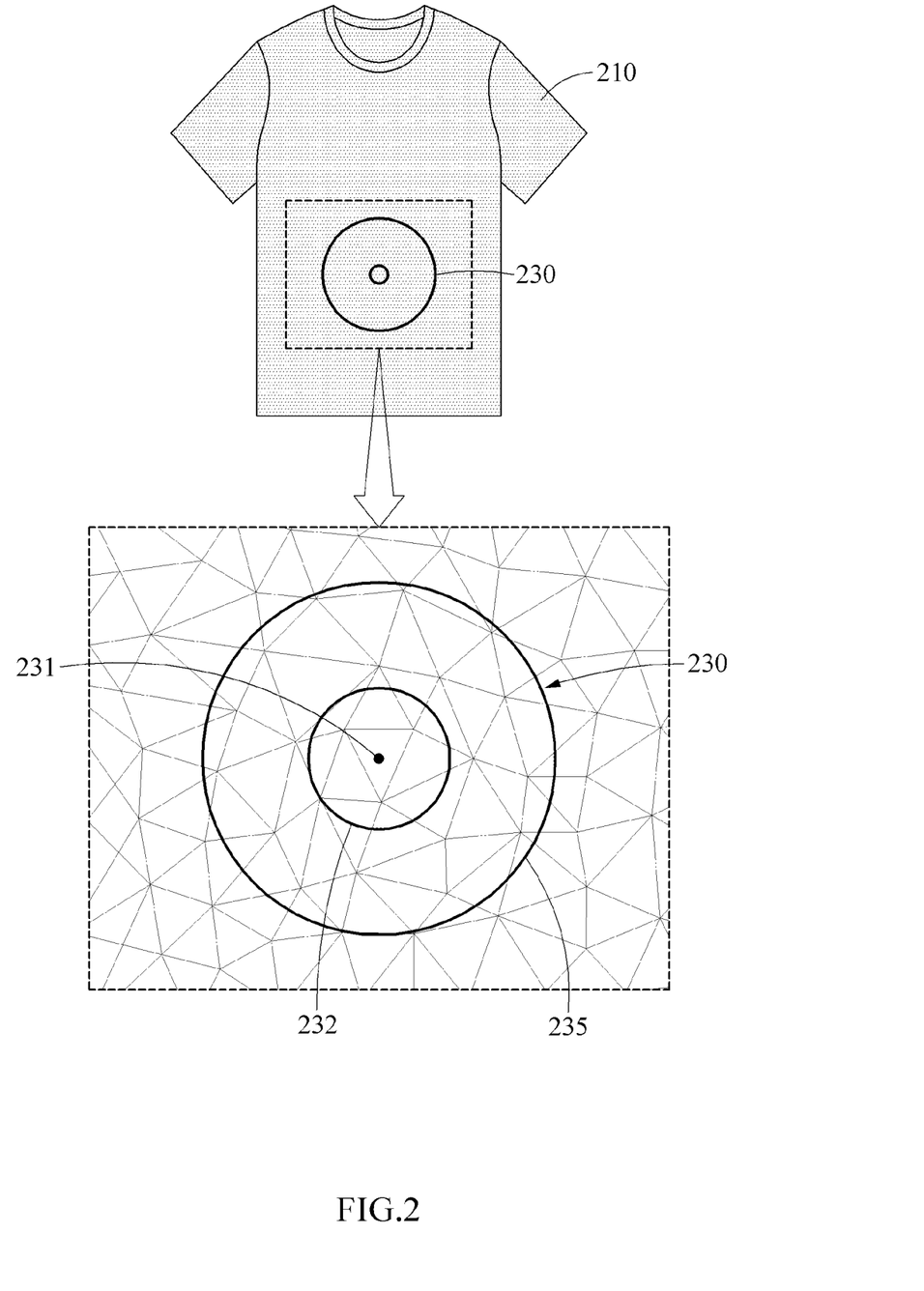
FIG. 2 is a diagram illustrating an example of a user interface for selecting a partial area of a three-dimensional (3D) model of a garment, according to an example embodiment.

A 3D model of a garment according to an example embodiment may be configured as, for example, a mesh including a plurality of triangles as illustrated in FIG. 2. In an example embodiment, a case in which the mesh includes triangles is described as an example for convenience of description, but the present disclosure is not limited thereto. In some cases, the mesh may be modeled by polygons of various other shapes.

The mesh may be modeled into various shapes. For example, points of the polygon included in the mesh, that is, vertices of the polygon may be points with masses (e.g., point mass), and sides of the polygon may be expressed as springs with elasticity that connect the masses. Accordingly, a 3D model of a garment according to an example embodiment may be modeled by, for example, a mass-spring model. The springs may have respective resistances to, for example, stretching, shearing, and bending based on a physical property of fabric used. In addition, the mesh may be modeled by a strain model. The polygon included in the mesh may be modeled as, for example, a triangle or may be modeled as a polygon of at least a quadrangle. In some cases, when a 3D volume is to be modeled, the mesh may be modeled as a 3D polyhedron. The 3D model of the garment may include, for example, at least one of a virtual garment for a 3D virtual character and a virtual garment for a 3D virtual avatar.

In an example embodiment, the user interface may be provided in a form of, for example, a brush having a predetermined thickness, but is not limited thereto. For example, the user may repetitively apply the input for selecting the partial area through the user interface. As described in detail below, when an input for selecting the partial area is received repeatedly, the simulation apparatus may cumulatively increase the first intensity and the second intensities in proportion to the number of the repetition. An input for selecting a partial area of a garment using the user interface will be described below in greater detail with reference to FIG. 2.

In operation 120, the simulation apparatus fixes first vertices of the first area corresponding to the internal geometric shape to a 3D space with the first intensity. Fixing a vertex with an intensity refers to enabling moving of the vertex to a degree that is correlated with the intensity. A vertex fixed with a higher intensity would move about to a less extent compared to another vertex fixed with a lower intensity, other conditions being equal. To effectuate such fixing scheme in accordance with intensity, virtual springs having spring constants corresponding to the first intensity are assigned to the first vertices.

The simulation apparatus may fix the first vertices to current positions of the first vertices in the 3D space using the virtual springs having the first spring constants. For example, the first spring constants may be determined in advance or set to a default value. In addition, the first intensity or the first spring constants may be updated to various values through a user's setting. Fixing the first vertices of the first area to the 3D space with the first intensity will be described in greater detail below with reference to FIG. 3.

In operation 130, the simulation apparatus determines second intensities for second vertices in a second area between the internal geometric shape and the external geometric shape based on the first intensity. Unlike the first vertices of which intensities are uniformly set to the first intensity, the second intensities assigned to the second vertices may change determined based on positions of the second vertices. For example, the second intensities may have values smaller than that of the first intensity, and gradually decrease as distances from the internal geometric shape increases towards to the external geometric shape. A method of determining the second intensities is described below in greater detail with reference to FIG. 4.

In operation 140, the simulation apparatus fixes the second vertices to the 3D space at the second intensities. A method of fixing the second vertices to the 3D space by the simulation apparatus is described in greater detail below with reference to FIG. 5.

In operation 150, the simulation apparatus simulates the 3D model of the garment by applying the first intensity and the second intensities determined in operation 130. In an example embodiment, vertices of the polygons included in the mesh may be moved by, for example, application of an external force such as gravity and an internal force such as stretching, shearing, and bending. The simulation apparatus may determine aggregate force applied to each vertex by calculating the external force and the internal force, and then determined a displacement velocity and a motion of each vertex. A movement of the garment may be simulated through by moving the vertices of the polygons by the determined amount, displacement velocity and motion of each vertex at each time step, for example, using an optimization process.

In operation 150, the simulation apparatus may calculate a force acting on vertices of polygons of a mesh configuring the 3D model of the garment further based on the first intensity and the second intensities, in addition to at least one of an external force by a physical property of the 3D model of the garment, gravity applied to the 3D model of the garment, and a repulsive force that prevents a collision between the 3D model of the garment and a skin of an avatar wearing the 3D model of the garment. The simulation apparatus may determine positions of the vertices based on the forces acting on the vertices.

For example, when a user input indicates selecting of the partial area is received repeatedly through the user interface, the simulation apparatus may cumulatively increase the first intensity and the second intensities based on the number of times that the input is repetitively received. The simulation apparatus may simulate the 3D model of the garment by applying the cumulatively increased first intensity and second intensities to a partial area of the 3D model of the garment.

A method of simulating the 3D model of the garment in the simulation apparatus is described in detail with reference to FIG. 6. The 3D model of the garment simulated by the simulation apparatus will be described with reference to FIG. 7.

FIG. 2 is a diagram illustrating an example of a user interface for selecting a partial area of a 3D model of a garment according to an example embodiment. FIG. 2 illustrates a 3D garment model 210 and a user interface 230 including an internal geometric shape 232 and an external geometric shape 235. In an example embodiment, the 3D garment model 210 is expressed with brevity for convenience of explanation, but the 3D garment model may be expressed in various designs other than what is shown in FIG. 2. For example, a user may point to a vertex 231 using the user interface 230 in a form of a brush, or select a partial area of the 3D garment model 210 by dragging a mouse while pointing the vertex 231.

When a partial area (e.g., an area included in the form of the brush) is selected by a user input through the user interface 230, the simulation apparatus may simulate the currently selected partial area (e.g., an area corresponding to the internal geometric shape 232 and an area (e.g., a donut-shaped area) between the internal geometric shape 232 and the external geometric shape 235). The simulation apparatus may maintain an existing simulation result of a remaining area other than the partial area selected by the user interface 230 in the 3D garment model 210. The existing simulation result may be a result of a prior simulation performed before the partial area is selected through the user interface 230. The prior simulation may have been performed while the garment is in a sewing state or a wearing state. The existing simulation result of the area other than the partial area selected by the user interface 230 is not simulated again during a current simulation operation where the first intensity and the second intensities to a partial area are applied. In this way, the overall computation associated with making more accurate simulation on the partial area or performing additional simulation with modification to the partial area can be significantly reduced. Further, a prior simulation may be performed on a computing device with a higher capacity and performance, while the current simulation may be performed on another computing device with lower capacity and performance.

According to an example embodiment, attributes of the internal geometric shape 232 and/or the external geometric shape 235 may be set in various configurations based on options available on the user interface 230. For example, shapes, sizes, and intensities of the internal geometric shape 232 and/or the external geometric shape 235 may be set using the user interface 230.

A second area defined by the external geometric shape 235 as its outermost line may be set by touching vertex 231 corresponding to a center of a partial area in the 3D garment model 210 by using a brush. In addition, the second area corresponding to the internal geometric shape 232 spaced inward from the external geometric shape 235 by a predetermined distance may be set by clicking the mouse at the predetermined distance inwards from the external geometric shape 235. In the example of FIG. 2, the internal geometric shape 232 and the external geometric shape 235 are shaped as circles that are concentric.

In an example embodiment, the user interface 230 may be used to set intensities of vertices included in areas (e.g., the first area and the second area). The intensities of the verities may set by spring constants of virtual springs attached to vertices.

The internal geometric shape 232 may be used to receive an additional external force at first vertices of the first area where the additional external force is not applied to other parts of the mesh. One or more vertices (including the vertex 231) of the first area delineated by the internal geometric shape 232 may be pinned to current positions in the 3D space without changing their locations.

In addition, the external geometric shape 235 may be used for receiving an additional external force (for example, the second intensities) that is gradually changed based on positions of second vertices in the second area. The second vertices of the second area in the external geometric shape 235 may be pinned to corresponding positions in the 3D space. The corresponding positions of the second vertices may change gradually in accordance with the second intensities assigned to the second vertices so that details such as pleats may be expressed.

In an example embodiment, a tag may be defined for each vertex corresponding to the partial area selected through the user interface 230. The tag for each vertex may include an intensity to be applied for the corresponding vertex. For example, when the first intensity of the first vertices is 0.7, the tags of the first vertices may include information indicating that the first intensity of 0.7 is assigned to the first vertices. In addition, when the second intensities of three second vertices are 0.2, 0.3, and 0.4, respectively, tags of the second vertices may include information indicating that these second vertices are assigned with intensities of 0.2, 0.3, and 0.4, respectively.

In some cases, the user may designate the vertex 231 using the user interface 230, and then select a partial area of the 3D garment model 210 by moving the user interface 230. Also, the user may repeatedly select the same partial area using the user interface 230. In response to repeated selection of the partial area, the simulation apparatus may cumulatively increase the first intensity and second intensities based on the number of times that the partial area is repeatedly selected.

Figure 3:
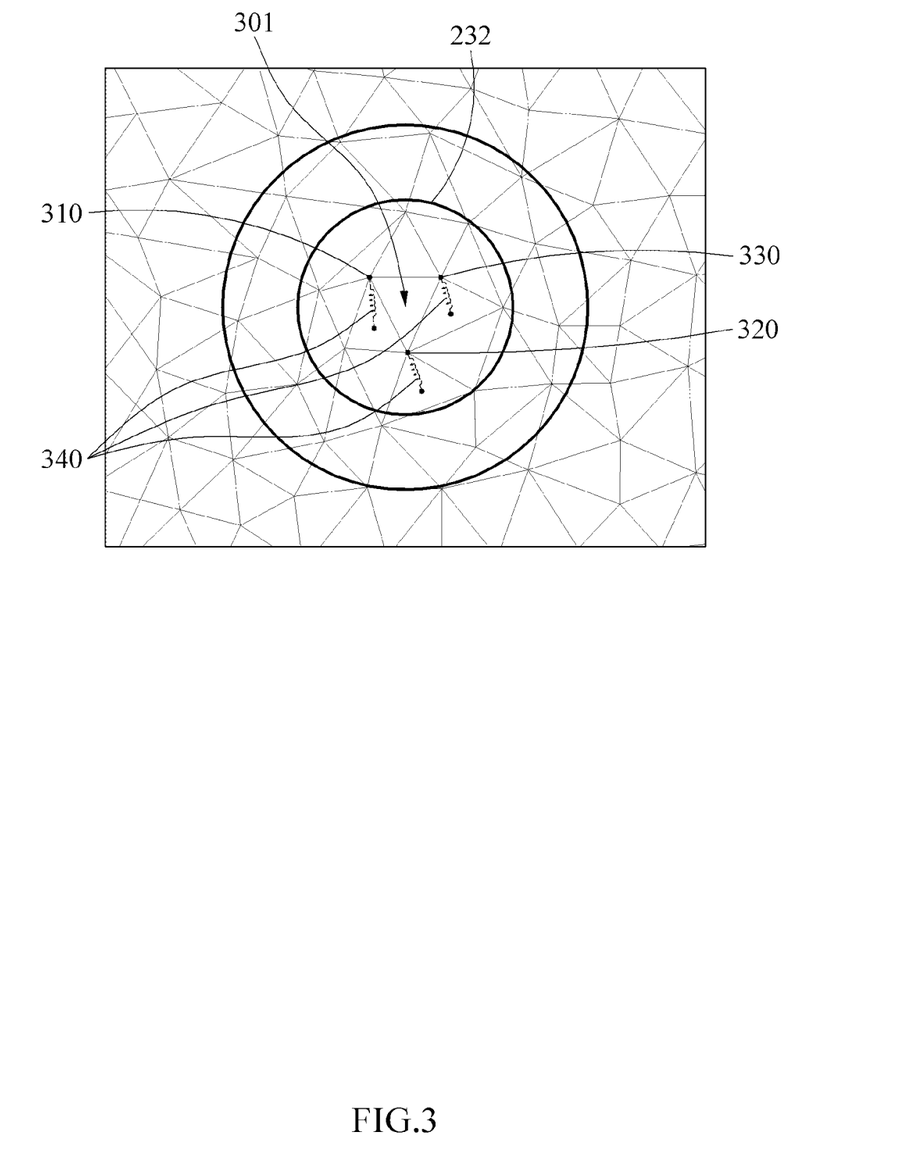
FIG. 3 is a diagram illustrating fixing first vertices of a first area to a 3D space with a first intensity, according to an example embodiment.

FIG. 3 is a diagram illustrating a method of fixing first vertices of a first area to a 3D space at a first intensity according to an example embodiment. FIG. 3 illustrates first vertices 310, 320, and 330 of polygons in the internal geometric shape 232 of a partial area selected by a user. After the partial area is designated, a simulation apparatus may search for the polygons 301 in the first area in the internal geometric shape 232. Then, the simulation apparatus may generate virtual springs 340 having a first intensity and apply them to the first vertices 310, 320, and 330 of each of the polygons 301. The simulation apparatus may fix the first vertices 310, 320, and 330 to current positions of the first vertices in the 3D space using the virtual springs 340 indicating the first intensity of fixing. For each of the virtual springs 340 having the first intensity, a first end of the virtual spring is connected to a first vertex, and a second end of the virtual spring is pinned to a current position of the first vertex in the 3D space.

Figure 4:
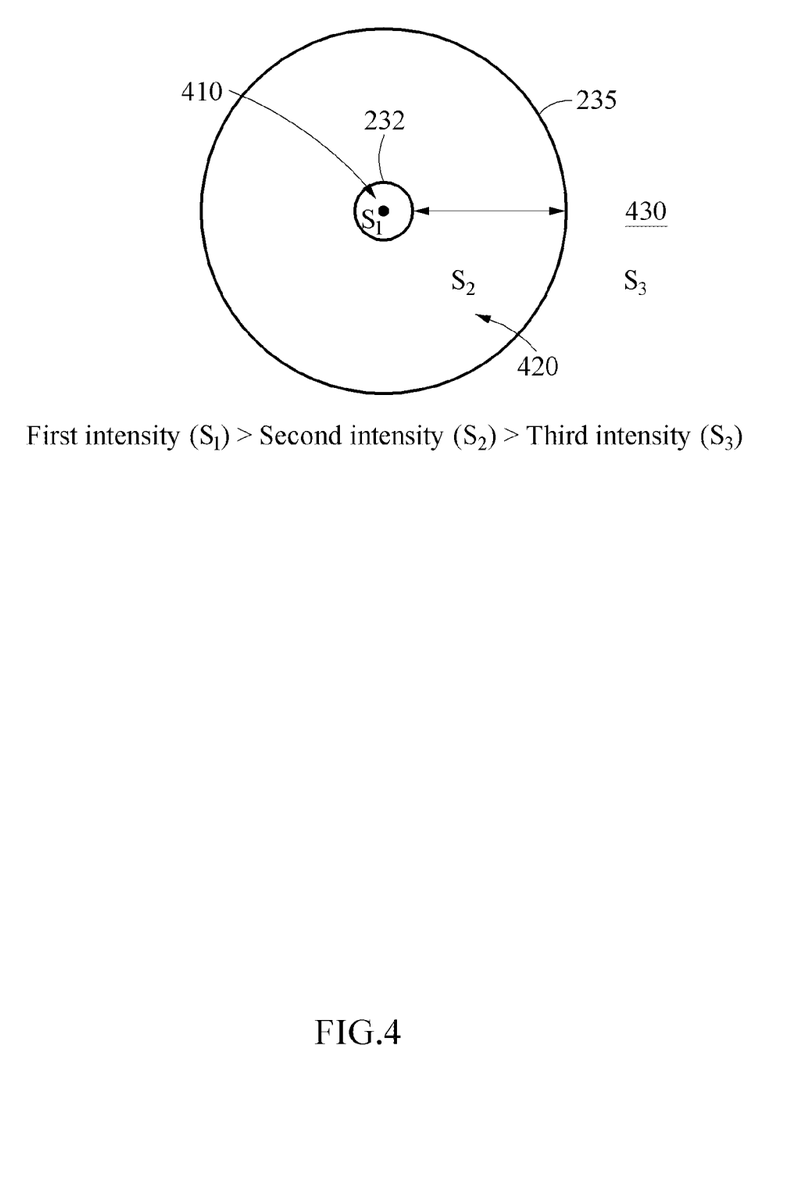
FIG. 4 is a diagram illustrating determining second intensities corresponding to second vertices in a second area, according to an example embodiment.

FIG. 4 is a diagram illustrating a method of determining second intensities $S_2$ of second vertices in a second area 420, according to an example embodiment. A first area 410 is in an internal geometric shape 232, a second area 420 is between the internal geometric shape 232 and an external geometric shape 235, and a third area 430 is outside the external geometric shape 235.

In an example embodiment, when fixing a partial area selected by a user or simulating crinkles or details, the partial area may be simulated independently to reflect an external force (e.g., caused by wind or gravity) that causes rotation or flying way of the partial area. Since the partial area corresponds to a portion of a pattern fragment constituting a 3D garment model, simulations may be performed on the first area 410 and the second area 420 while a shape for the third area 430 outside the selected partial area is maintained. The simulation apparatus may determine intensities of fixing such that the first area 410, the second area 420 and the third area 430 other than the partial area are simulated in a realistic manner. Specifically, the simulation apparatus may fix first vertices of the first area 410 to a 3D space with a first intensity $S_1$, and then determine the second intensities $S_2$ of second vertices in the second area 420 based on the first intensity $S_1$.

The simulation apparatus may determine the second intensities $S_2$ of the second vertices such that the second intensities $S_2$ have values smaller than that of the first intensity $S_1$, and gradually decreasing the second intensities $S_2$ as distances from the internal geometric shape 232 increases. In other words, the second vertices closer to the internal geometric shape 232 have higher second intensities S2 compared to second vertices located closer to the outer geometric shape 235. The increase of the second intensities S2 as the second vertices approach the internal geometric shape 232 may be linear.

The first intensity S1 may be greater than the second intensities S2. In addition, the second intensities S3 may be greater than a third intensity S3 of the third area 430. The third intensity S3 may be determined by physical properties of a garment, and may be zero. In an example embodiment, since the intensity applied to the partial area selected through the user interface is sufficiently greater compared to the intensity determined by the physical properties of the garment, the third intensity S3 may be zero.

In some cases, when the partial area is selected repeatedly, the simulation apparatus may cumulatively increase the first intensity and the second intensities based on the number of times that the partial area is selected. For example, the first intensity may be 500, and the second intensities may be greater than 0 and less than 500. When a partial area is selected repeatedly three times through the user interface, the first intensity may become 1500 (=500×3) and the second intensities may be values greater than 0 and less than 1500.

Figure 5:
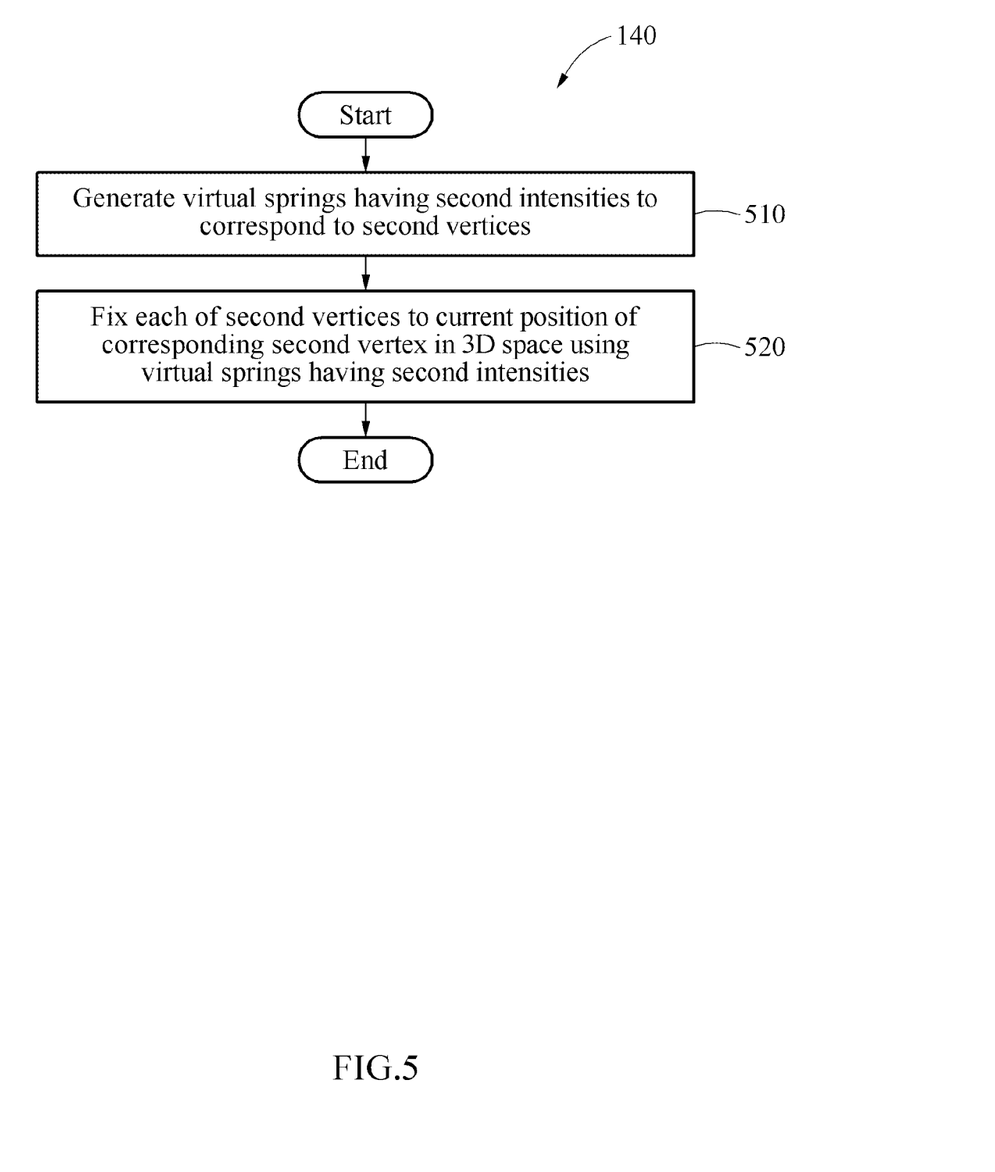
FIG. 5 is a flowchart illustrating a method of fixing second vertices of a second area to a 3D space with a second intensity, according to an example embodiment.

FIG. 5 is a flowchart illustrating a method of fixing second vertices of a second area to a 3D space with second intensities, according to an example embodiment. In the following example embodiments, operations may, but not necessarily, be performed in the sequential order. For example, the order of each operation may be changed, and at least two operations may be performed in parallel.

FIG. 5 illustrates a process of fixing a second vertex in a 3D space by a simulation apparatus through operations 510 and 520. In operation 510, the simulation apparatus may generate virtual springs having second intensities to be assigned to second vertices. In a mesh of a 3D garment model, the simulation apparatus may search for polygons corresponding to a second area. The simulation apparatus may generate virtual springs having the second intensities of the second vertices of the polygons. A second intensity of each of the virtual springs may vary based on the position of a corresponding second vertex. The second intensities of the second vertices may decrease gradually as distances between the second vertices and the internal geometric shape increase.

In operation 520, the simulation apparatus may fix each of the second vertices to a current position of the corresponding second vertex in a 3D space using the virtual springs having spring constants corresponding to the second intensities.

Figure 6:
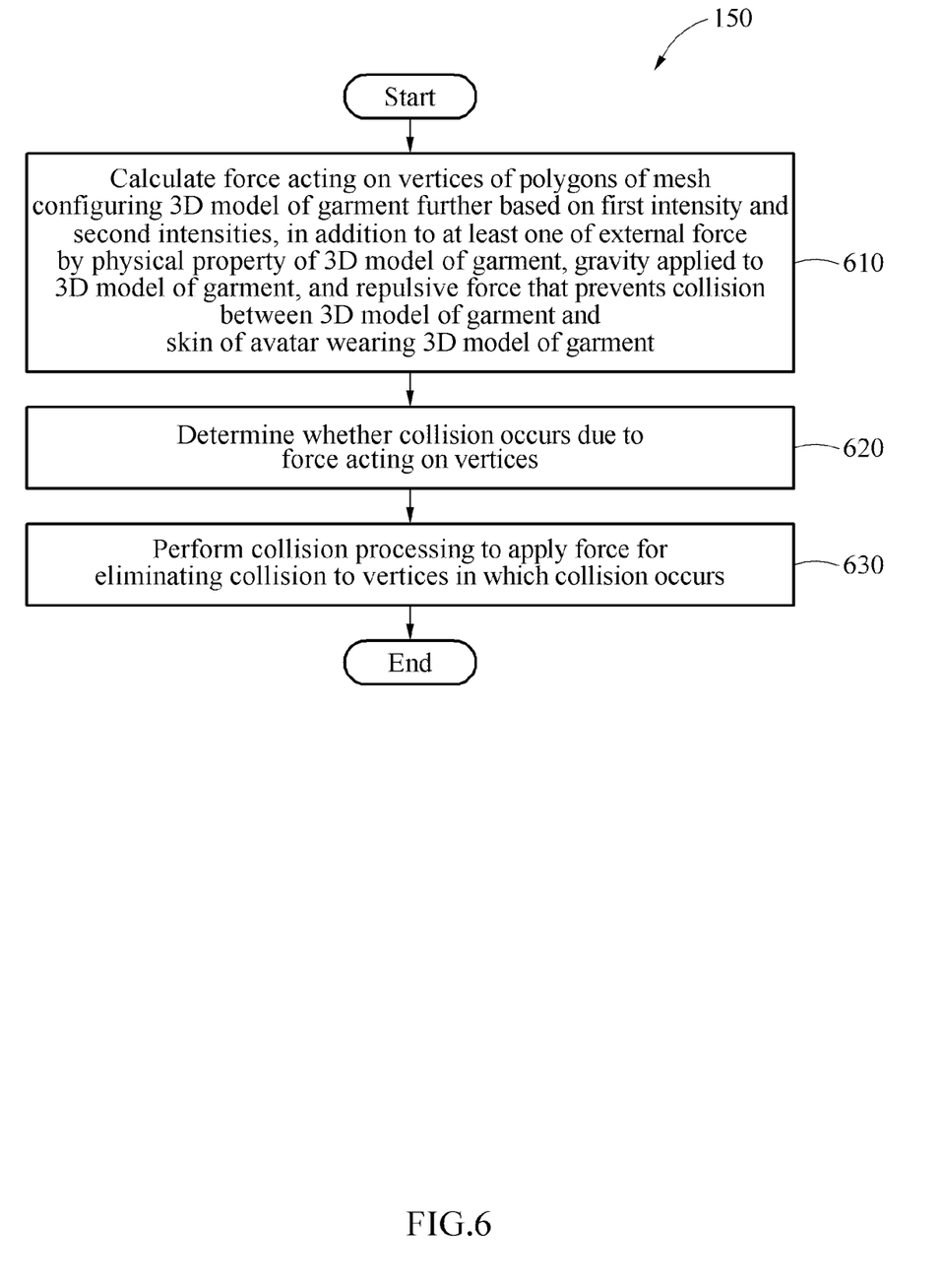
FIG. 6 is a flowchart illustrating a method of simulating a 3D model of a garment, according to an example embodiment.

FIG. 6 is a flowchart illustrating a method of simulating a 3D model of a garment according to an example embodiment. In the following example embodiments, operations may, but not necessarily, be performed in the sequential order. For example, the order of each operation may be changed, and at least two operations may be performed in parallel.

FIG. 6 illustrates a process of simulating a 3D garment model by a simulation apparatus through operations 610 to 630, according to an example embodiment. In operation 610, the simulation apparatus may determine a force acting on vertices of polygons of a mesh constituting a 3D model of a garment further due to a first intensity and second intensities, in addition to at least one of an external force by a physical property of the 3D model of the garment, gravity applied to the 3D model of the garment, and a repulsive force that prevents a collision between the 3D model of the garment and a skin of an avatar wearing the 3D model of the garment. The repulsive force may also be used to prevent a collision between the 3D model of the garment and an object other than the avatar's skin (e.g., furniture on which the garment rests or an object interacting with the avatar).

In operation 620, the simulation apparatus may determine whether a collision occurs due to the force acting on the vertices as determined in operation 610. For example, the simulation apparatus may determine whether the collision occurs based on whether positions of moved vertices overlap or intersect due to a speed generated by the force determined in operation 610.

When it is determined in operation 620 that the collision occurs, in operation 630, the simulation apparatus may perform collision processing to apply a force to eliminate the collision of the vertices. For example, when garments on the avatar are multi-layered (e.g., wearing a shirt, a cardigan, and a jacket), a collision (or crossover) between outerwear and innerwear may occur. When it is determined that the collision between the outerwear and the innerwear occurs, the simulation apparatus may calculate a distance field for determining whether a direction faces outward or inward the avatar in a 3D space. Then, a mesh where the collision occurs at the outerwear is pushed in a gradient direction of the distance field on a midpoint of a collusion line segment where the collision occurs between the outerwear and the innerwear. In addition, an intensity of collision-eliminating force may be determined to push part of the mesh where the collision is to occur at the innerwear in a direction opposite to the gradient direction of the distance field.

The "distance field" described herein refers to a data structure that stores a distance from a surface of one object (e.g., an avatar) closest to a unit of space (e.g., voxel) in 3D space. To use the distance field, the simulation apparatus may divide the 3D space into grids, calculate a distance from a surface of an avatar to a center of a voxel closest to the surface of the avatar, and store the calculated distance in the voxel. The "voxel" corresponds to a unit of graphic information defining a point in the 3D space. In terms of mathematics, the distance field may correspond to a scalar field. The simulation apparatus may obtain a gradient for the scalar field, which may be a vector field. A vector in this vector field indicates in which direction the scalar value increase most drastically, and define such direction as "outward avatar direction" in which a distance from an avatar surface increases.

For example, when garments worn on the avatar are multi-layered, polygons (e.g., triangles) of meshes constituting outerwear and innerwear intersect or collide may appear as a single line segment. Such line segment may be referred to as an "intersecting line segment." In this example, a direction in which a force is applied to the polygon of the mesh configuring the outerwear may be a gradient direction of a distance field obtained at a midpoint of the intersecting line segment, for example, the outward avatar direction, and a direction in which a force is applied to the polygon of the mesh of the innerwear may be a direction opposite to the outward avatar direction.

Using the above-described method, the simulation apparatus may generate a force for eliminating the collision and perform the collision processing to apply the force for eliminating the collision to the vertices.

Figure 7:
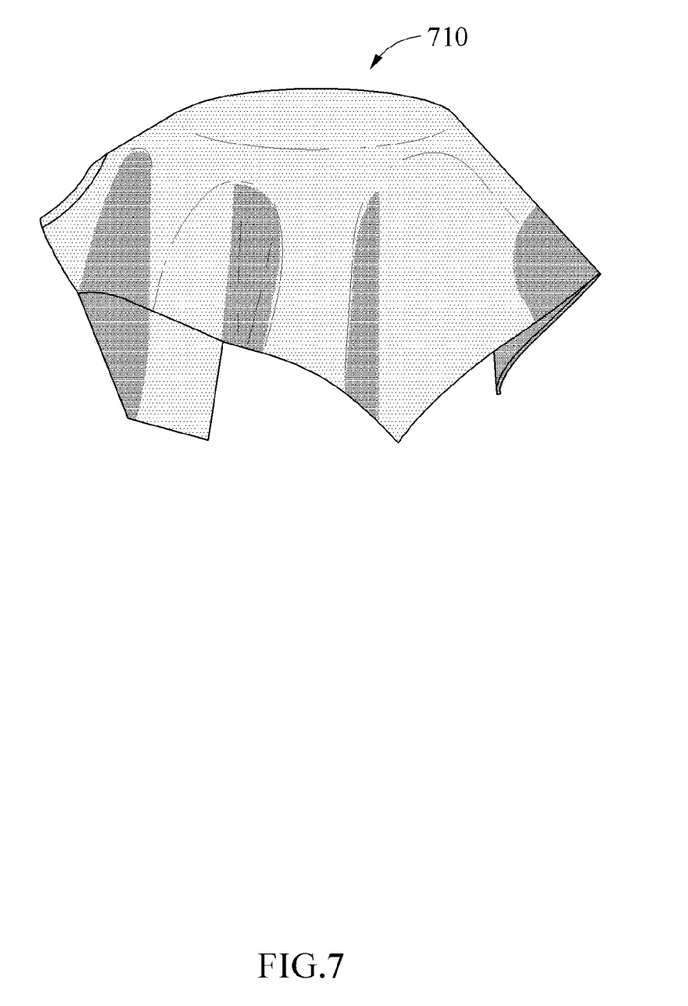
FIG. 7 is a diagram illustrating an example of a 3D model of a garment simulated, according to an example embodiment.

FIG. 7 is a diagram illustrating an example of a 3D model of a garment simulated, according to an example embodiment. Referring to FIG. 7, in a partial area selected through a user interface according to an example embodiment, a first area may be fixed with a first intensity and a second area may be fixed with second intensities less than the first intensity gradually so that a simulated 3D garment model 710 is displayed.

For example, the second area may be an area that corresponds to the top of a cylinder when user selects the area corresponding to the top of the cylinder. And the first area may be included in the second area. The first area may be fixed with the first intensity and the second area may be fixed with the second intensities less than the first intensity gradually so that a simulated 3D garment model 710 is displayed. And the rest of the area that is outside of the second area may be fixed with third intensity.

As another example, the first area can be an area that corresponds to the top of a cylinder when user select the area corresponds to the top of the cylinder. Hence, the area that corresponds to the top of the cylinder may be fixed with the first intensity. The first area may be fixed with the first intensity and the second area may be fixed with the second intensities less than the first intensity gradually so that a simulated 3D garment model 710 is displayed.

As described above, an existing simulation result of a remaining area other than the partial area selected through the user interface may remain without changing.

Figure 8:
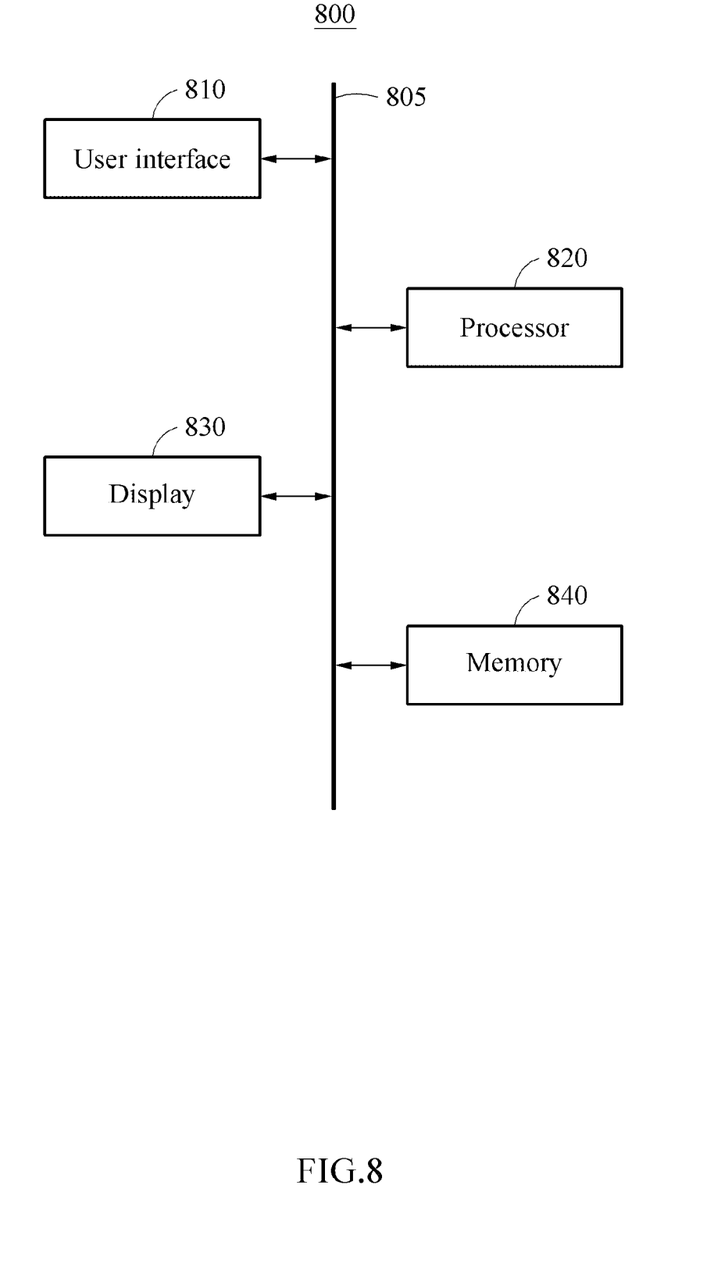
FIG. 8 is a block diagram illustrating a simulation apparatus, according to an example embodiment.

FIG. 8 is a block diagram illustrating a simulation apparatus according to an example embodiment. Referring to FIG. 8, a simulation apparatus 800 according to an example embodiment may include a user interface 810, a processor 820, a display 830, and a memory 840. The user interface 810, the processor 820, the display 830, and the memory 840 may be connected to one another through a communication bus 805.

The user interface 810 includes an internal geometric shape and an external geometric shape and receives an input selecting a partial area of a 3D model of a garment. In some cases, the user interface 810 may include a first user interface corresponding to an internal geometric shape and a second user interface corresponding to an external geometric shape.

The processor 820 fixes first vertices of a first area corresponding to the internal geometric shape to a 3D space at a first intensity. The processor 820 determines second intensities corresponding to second vertices in a second area between the internal geometric shape and the external geometric shape based on the first intensity. The processor 820 fixes the second vertices to the 3D space at the second intensities. The processor 820 simulates the 3D model of the garment by applying the first intensity and the second intensities.

The processor 820 may generate virtual springs having the first intensity to correspond to the first vertices. The processor 820 may fix the first vertices to current positions of the first vertices in a 3D space using the virtual springs having the first intensity. For each of the virtual springs having the first intensity, a first end of both ends of a corresponding spring may be connected to a corresponding first vertex and a second end of both ends may be fixed to a current position of the corresponding first vertex in the 3D space.

The processor 820 may determine the second intensities such that the second intensities have values smaller than that of the first intensity, gradually as distances from positions of the second vertices increase in a direction from the internal geometric shape to the external geometric shape.

The processor 820 may generate virtual springs having the second intensities to correspond to the second vertices. The processor 820 may fix a corresponding second vertex to a current position of the corresponding second vertex in the 3D space using each of the virtual springs having the second intensities.

The processor 820 may calculate a force acting on vertices of polygons of a mesh configuring the 3D model of the garment further based on the first intensity and the second intensities, in addition to at least one of an external force by a physical property of the 3D model of the garment, gravity applied to the 3D model of the garment, and a repulsive force that prevents a collision between the 3D model of the garment and a skin of an avatar wearing the 3D model of the garment. The processor 820 may simulate positions of the vertices based on the force acting on the vertices.

In response to the input for selecting the partial area being repetitively received through the user interface 810, the processor 820 may cumulatively increase the first intensity and the second intensities based on a number of times that the input is repetitively received and simulate the 3D model of the garment by applying the cumulatively increased first intensity and second intensities to a partial area of the 3D model of the garment.

The display 830 displays the 3D model of the garment simulated by the processor 820.

The memory 840 may store information on a partial area received through the user interface 810. The information on the partial area may include, for example, location coordinates, a tag of a clothing pattern at a position corresponding to the partial area, or an index but is not limited thereto. The memory 840 may store the first intensity and the second intensities determined by the processor 820. The memory 840 may store further store one or more of the following: the simulated 3D model of the garment by applying the first intensity and the second intensities, information on an external force due to a movement of the internal geometric shape, information used for simulating crinkles formed by the processor 820, the result of the simulation.

Further, the memory 840 may store various information generated in the above-described process of processing of the processor 820. Further, the memory 840 may store various data and programs. The memory 840 may include volatile memory or non-volatile memory. The memory 840 may include a high-capacity storage medium such as a hard disk to store various data.

In addition, the processor 820 may perform at least one of the methods described above with reference to FIGS. 1 through 7 or an algorithm corresponding to at least one of the methods. The processor 820 may be a hardware-implemented simulation apparatus having a circuit that is physically structured to execute desired operations. For example, the desired operations may include code or instructions included in a program. The processor 820 may include, for example, a central processing unit (CPU), a graphics processing unit (GPU), or a neural network processing unit (NPU). For example, the simulation apparatus 800 implemented as hardware may include a microprocessor, a CPU, a processor core, a multi-core processor, a multiprocessor, an application-specific integrated circuit (ASIC), and a field-programmable gate array (FPGA).

The processor 820 may execute a program and may control the simulation apparatus 800. Codes of the program executed by the processor 820 may be stored in the memory 840.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

While this disclosure includes specific example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example embodiment are to be considered as being applicable to similar features or aspects in other example embodiments. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A simulation method comprising:
receiving selection of a partial area of a three-dimensional (3D) model of a garment, the partial area including an internal geometric shape and an external geometric shape;
assigning first virtual springs to first vertices of a first area in the internal geometric shape to fix the first vertices in 3D space with a first intensity;
assigning second virtual springs to second vertices in a second area between the internal geometric shape and the external geometric shape to fix the second vertices in the 3D space with second intensities; and
simulating deformation or movement of the 3D model of the garment by fixing the first vertices with the first virtual springs and fixing the second vertices with the second virtual springs, wherein the first intensity is greater than the second intensities, and wherein less movement or deformation of a vertex in the 3D space is permitted when the vertex is fixed with a higher intensity.

2. The simulation method of claim 1, wherein one end of each of the virtual springs is connected to a corresponding first vertex or second vertex and another end of each of the virtual springs is fixed to a position in the 3D space.

3. The simulation method of claim 1, wherein each of the second intensities is smaller than the first intensity, the second intensities gradually increasing as distances of the second vertices increase from the internal geometric shape, wherein less movement or deformation of a vertex in the 3D space is permitted when the vertex is fixed with a higher intensity.

4. The simulation method of claim 1, wherein the simulating of the 3D model of the garment comprises:
determining a fixing force acting on vertices of a mesh of the 3D model of the garment based on the first intensity and the second intensities, and a repulsive force to prevent a collision between the 3D model of the garment and a 3D model of another object; and
determining positions of the vertices based at least on the fixing force and the repulsive force.

5. The simulation method of claim 4, wherein the positions of the vertices are determined by:
determining whether a collision occurs between the mesh of the 3D model of the garment and the 3D model of the other object due to the force acting on the vertices; and
performing, in response to determining that the collision occurs, applying the repulsive force on vertices of the 3D model of the garment where the collision occurs.

6. The simulation method of claim 4, further comprising:
determining a gradient direction of a distance field indicating distances from a surface of the 3D model of the garment to voxels in 3D space; and
determining a direction of the repulsive force on the vertices of the 3D model of the garment as the gradient direction or a direction opposite to the gradient direction.

7. The simulation method of claim 1, further comprising:
in response to repeatedly receiving the selection of the partial area, cumulatively increasing the first intensity and the second intensities in proportion to a number of times that the selection is received,
wherein the simulating of the 3D model of the garment comprises applying the cumulatively increased first intensity and second intensities to vertices in the partial area of the 3D model of the garment.

8. The simulation method of claim 1, further comprising receiving setting of the internal geometric shape and the external geometric shape from a user.

9. The simulation method of claim 8, wherein the internal geometric shape and the external geometric shape are circles that are concentric.

10. The simulation method of claim 1, wherein the 3D model of the garment is a virtual garment for a 3D virtual character or a virtual garment for a 3D virtual avatar.

11. The simulation method of claim 1, wherein assigning the first virtual springs to the first vertices comprises searching polygons of a mesh forming the 3D model of the garment in the first area to assign the first virtual springs, and wherein assigning the second virtual springs to second vertices comprises searching polygons of the mesh in the second area to assign the second virtual springs.

12. A non-transitory computer-readable storage medium storing instructions thereon, the instructions, when executed by a processor, cause the processor to:
receive selection of a partial area of a three-dimensional (3D) model of a garment, the partial area including an internal geometric shape and an external geometric shape;
assign first virtual springs to first vertices of a first area in the internal geometric shape to fix the first vertices in 3D space with a first intensity;
assign second virtual springs to second vertices in a second area between the internal geometric shape and the external geometric shape to fix the second vertices in the 3D space with second intensities; and
simulate deformation or movement of the 3D model of the garment by fixing the first vertices with the first virtual springs and fixing the second vertices with the second virtual springs, wherein the first intensity is greater than the second intensities, and wherein less movement or deformation of a vertex in the 3D space is permitted when the vertex is fixed with a higher intensity.

13. The non-transitory computer-readable storage medium of claim 12, wherein each of the second intensities is smaller than the first intensity, the second intensities gradually increasing as distances of the second vertices increase from the internal geometric shape, wherein less movement or deformation of a vertex in the 3D space is permitted when the vertex is fixed with a higher intensity.

14. The non-transitory computer-readable storage medium of claim 12, wherein instructions to simulate the 3D model of the garment comprises instructions to:
determine a fixing force acting on vertices of a mesh of the 3D model of the garment based on the first intensity and the second intensities, and a repulsive force to prevent a collision between the 3D model of the garment and a 3D model of another object; and
determine positions of the vertices based at least on the fixing force and the repulsive force.

15. The non-transitory computer-readable storage medium of claim 14, wherein the positions of the vertices are determined by:
determining whether a collision occurs between the mesh of the 3D model of the garment and the 3D model of the other object due to the force acting on the vertices; and
performing, in response to determining that the collision occurs, applying the repulsive force on vertices of the 3D model of the garment where the collision occurs.

16. The non-transitory computer-readable storage medium of claim 12, further storing instruction causing the processor to:
in response to repeatedly receiving the selection of the partial area, cumulatively increase the first intensity and the second intensities in proportion to a number of times that the selection is received,
wherein the instructions to simulate the 3D model of the garment comprises instructions to apply the cumulatively increased first intensity and second intensities to vertices in the partial area of the 3D model of the garment.

17. The non-transitory computer-readable storage medium of claim 12, wherein one end of each of the virtual springs is connected to a corresponding first vertex or second vertex and another end of each of the virtual springs is fixed to a position in the 3D space.

18. A non-transitory computer-readable storage medium storing a simulation result of a three-dimensional (3D) model of a garment, generated by:
receiving selection of a partial area of the 3D model of the garment, the partial area including an internal geometric shape and an external geometric shape;
assigning first virtual springs to first vertices of a first area in the internal geometric shape to fix the first vertices in 3D space with a first intensity;
assigning second virtual springs to second vertices in a second area between the internal geometric shape and the external geometric shape to fix the second vertices in the 3D space with second intensities; and
simulating deformation or movement of the 3D model of the garment by fixing the first vertices with the first virtual springs and fixing the second vertices with the second virtual springs wherein the first intensity is greater than the second intensities, and wherein less movement or deformation of a vertex in the 3D space is permitted when the vertex is fixed with a higher intensity.

\* \* \* \* \*